Oct. 10, 1950        W. RICHTER        2,525,046

FREQUENCY MEASURING DEVICE

Filed March 29, 1945

Inventor
Walther Richter
by Didier Journeaux
Attorney

Patented Oct. 10, 1950

2,525,046

UNITED STATES PATENT OFFICE 2,525,046

FREQUENCY MEASURING DEVICE

Walther Richter, Milwaukee, Wis., assignor to Allis-Chalmers Manufacturing Company, Milwaukee, Wis., a corporation of Delaware Application March 29, 1945, Serial No. 585,505

9 Claims. (Cl. 250—27)

This invention relates in general to frequency responsive devices and more particularly to an improved device operating by alternate charge and discharge of a capacitor in which the readings are unaffected by voltage variations of the source of charging current and of the source of which the frequency is to be measured.

It is an object of the present invention to provide a frequency responsive device in which a capacitor is periodically charged at a predetermined voltage and afterwards discharged through circuits of which only one includes an electric valve.

Another object of the present invention is to provide a frequency responsive device in which the charge and the discharge of a capacitor are controlled by electrostatically produced potential impulses.

Another object of the present invention is to provide a frequency responsive device in which the range of frequency response may be varied without otherwise affecting the operation of the device.

Figure 1:
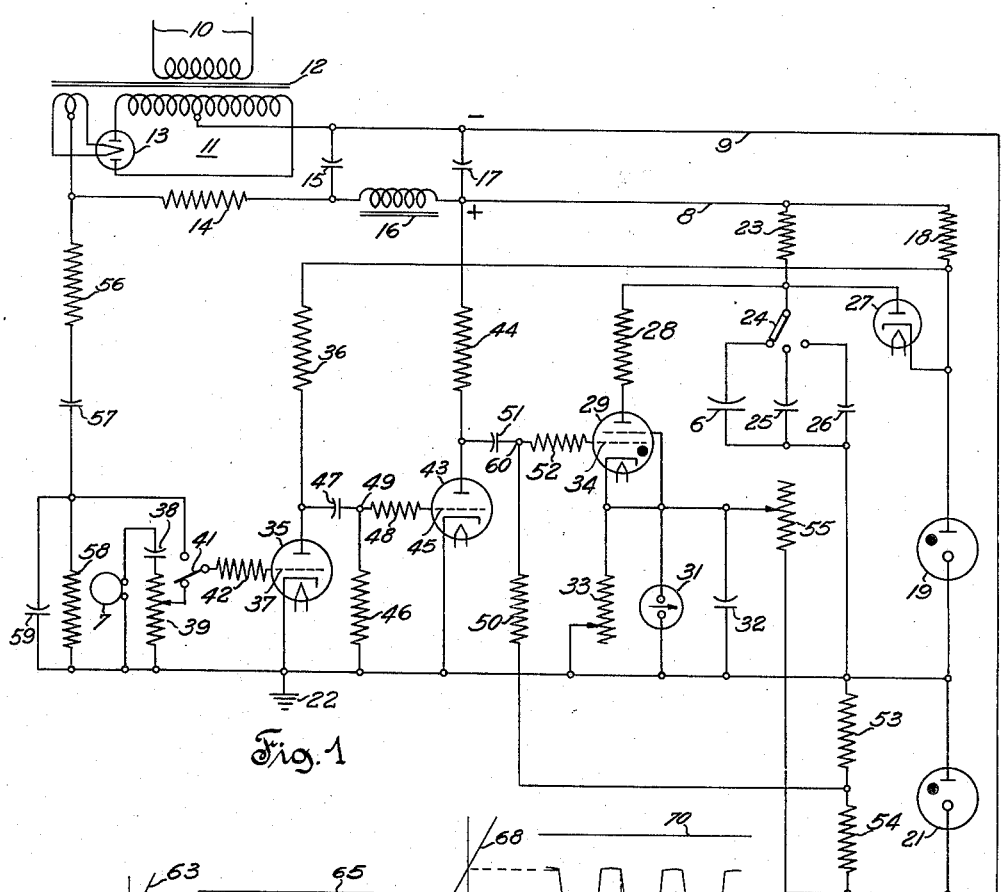
Figures 2, 3:
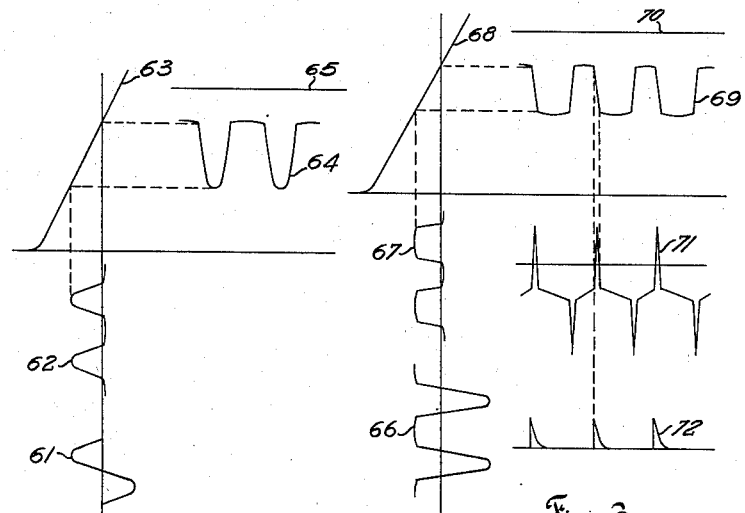

Objects and advantages other than those above set forth will be apparent from the following description when read in connection with the accompanying drawing, in which:

Fig. 1 diagrammatically illustrates one embodiment of the present invention in which a capacitor is periodically charged from a rectifier and discharged through a current measuring device and through a thyratron controlled by a two-stage amplifier and a differentiating circuit;

Fig. 2 is a diagram relating to the operation of the first stage of the amplifier; and Fig. 3 is a diagram relating to the operation of the second stage of the amplifier and of the differentiating circuit.

Referring more particularly to the drawing by characters of reference, the device diagrammatically represented in Fig. 1 comprises a capacitor 6 which is to be alternately charged and discharged at the frequency of a voltage source 7 represented conventionally as a synchronous generator. Capacitor charging current is supplied from a direct current circuit 8, 9 energized from an alternating current circuit 10 through a rectifier generally represented by 11. Circuit 10 may be energized from any suitable generator (not shown) operating at a known fixed frequency such as 60 cycles per second. Rectifier 11 may be of any suitable known type and may comprise a transformer 12 associated with a full wave rectifying tube 13. The connections between rectifier 11 and circuit 8, 9 are effected through suitable filtering means which may comprise a series resistor 14, a shunt capacitor 15, a series reactor 16 and a second shunt capacitor 17.

Circuit 8, 9 is connected with a voltage divider comprising an impedance element and at least one constant voltage device. In the preferred embodiment illustrated in the drawing, the voltage divider consists of a current limiting resistor 18 and two glow discharge devices or glow tubes 19, 21. It will be understood, however, that other constant voltage devices may be used instead, such as batteries or dynamo electric machines. The point of juncture of glow tubes 19, 21 constitutes an intermediate tap of circuit 8, 9 and may conveniently be grounded to the frame of the device as indicated at 22.

The circuit for charging capacitor 6 from circuit 8, 9 includes a resistor 23, a selector switch 24 and glow tube 21. Switch 24 is provided to permit substituting at will suitable capacitors 25, 26 of different capacities for capacitor 6 to vary the range of frequency response of the device without otherwise affecting its operation. Glow tube 19 is connected across capacitor 6 through any suitable rectifying device such as a diode 27 to limit the voltage of capacitor 6 to a predetermined constant value. Diode 27 may be replaced by a plurality of diodes connected in parallel to reduce the resistance of the connection between the capacitor and the glow tube.

Capacitor 6 is associated with a discharging circuit comprising a current limiting resistor 28, a discontinuously controllable electric valve such as a thyratron 29 and a milliammeter 31 or other equivalent current measuring device. Meter 31 is preferably connected in parallel with a filtering capacitor 32 and with a variable resistor 33 serving to adjust the sensitiveness of the meter to the desired value.

Alternate operation of the capacitor charging and discharging circuits is caused to take place periodically by rendering thyratron 29 periodically conductive in response to the voltage of generator 7. The conductivity of thyratron 29 is controlled by impressing on the control grid 34 thereof periodic potential impulses of shorter duration than the discharge periods of capacitor 6. The latter result is obtained by means of a system comprising a two-stage wave distorting amplifier and a differentiating circuit.

The amplifier comprises the first triode 35 connected across glow tube 19 through a plate resistor 36. Grid 37 of triode 35 is impressed with periodic potential from generator 7 through a capacitor 38, a voltage divider 39, a selector switch 41 and a grid resistor 42. The amplifier also comprises a second triode 43 connected between conductor 8 and ground through a plate resistor 44. The grid 45 of triode 43 is connected with triode 35 through any suitable known coupling circuit, such as a resistance-capacitance coupling connection comprising a resistor 46 and a capacitor 47, and through a grid resistor 48 connected with point 49 of the coupling circuit.

Grid 34 of thyratron 29 is connected with triode 43 through a known differentiating circuit comprising a resistor 50 and a capacitor 51 and through a grid resistor 52. Resistor 50 is connected with any suitable source of negative bias potential such as a voltage divider consisting of two resistors 53, 54 connected across glow tube 21. The dimensions of the capacitor 51 and of resistor 50 are such that the combination of these two elements has a time constant which is considerably smaller than the discharge periods of capacitors 6, 25 and 26.

The range of frequencies over which the device is responsive may be adjustably shifted by supplying to meter 31 a current component independent of the operation of capacitor 6 and of its associated charging and discharging circuits. This current component is preferably obtained by connecting the positive terminal of meter 31 with conductor 9 through an adjustable resistor 55. Meter 31 may be calibrated by impressing on grid 37 a potential of known fixed frequency obtained from the positive terminal of rectifier 11 through switch 41 and through a calibrating circuit comprising a resistor 56 in series with a capacitor 57 associated with a shunt path to ground comprising a resistor 58 connected in parallel with a capacitor 59.

The range of frequency response of the device may be varied in any desired manner by varying the elements of the circuits thereof. It has been found that the device operates satisfactorily responsive to frequencies within the range from 100 to 150 cycles per second when built up of elements identified by the following engineering data:

Rectifier 13, type 80
Glow tube 19, type VR 105/30
Glow tube 21, type VR 75/30
Diode 27, type 6H6 GT
Thyratron 29, type 2050
Triodes 35, 43, type 6SL7 GT
Resistor 28, 100 ohms
Resistors 14, 33, 1,000 ohms
Resistors 18, 53, 10,000 ohms
Resistor 50, 50,000 ohms
Resistor 54, 75,000 ohms
Resistor 55, 90,000 ohms
Resistors 23, 52, 44, 36, 0.1 megohm
Resistor 46, 0.25 megohm
Resistors 39, 42, 58, 48, 0.5 megohm
Resistor 56, 1 megohm
Capacitors 51, 59, 0.0001 microfarad
Capacitor 57, 0.00025 microfarad
Capacitors 47, 38, 6, 0.1 microfarad
Capacitor 32, 0.5 microfarad
Capacitors 15, 17, 10 microfarads
Circuit 8, 9, 300 volts
Reactor 16, 15 henries The range of the device may be extended to 200 cycles per second by assigning to capacitor 25 a capacity of .075 microfarad and may further be extended to 250 cycles per second by assigning to capacitor 26 a capacity of .06 microfarad.

In operation, when circuit 10 is energized at its normal operating frequency rectifier 11 supplies current to circuit 8, 9 under a voltage having a unidirectional component and a series of alternating components of frequencies multiple of the frequency of circuit 10. Capacitors 15, 17 and reactor 16 cooperate to filter the alternating components out of the voltage impressed on circuit 8, 9. Resistor 14 limits the periodic peaks of the current of rectifying tube 13 and also causes the alternating components of the rectifier output voltage to be impressed on the calibrating circuit.

The voltage impressed from circuit 8, 9 on glow tubes 19, 21 through resistor 18 is sufficiently high to cause the glow tubes to break down and carry current. The characteristic of the glow tubes is that once they carry current their terminal voltage remains practically constant regardless of variations in their flow of current within predetermined limits. The terminal voltage of tube 19 may be 150 volts, for example, and that of tube 21 may be 75 volts.

Circuit 8, 9 also supplies charging current to capacitor 6 through resistor 23, switch 24 and glow tube 21. The capacitor thus tends to be charged to the voltage impressed between conductor 8 and ground. As soon as the voltage of the capacitor reaches the terminal voltage of glow tube 19, however, current flows from conductor 8 through resistor 23, diode 27 and glow tubes 19, 21 to conductor 9, whereby the charging operation of the capacitor is abruptly terminated and the capacitor remains charged at substantially the terminal voltage of glow tube 19.

Capacitor 6 is periodically discharged through thyratron 29 at the frequency of the voltage of generator 7 as a result of the energization of grid 34 from generator 7 in the manner illustrated in the diagrams of Figs. 2 and 3. Voltage divider 39 may be adjusted in dependence upon the magnitude of the voltage of generator 7 to cause impression on switch 41 of a potential represented by sinusoidal curve 61, the negative peaks of which do not reach the cut off potential of grid 37. The negative half waves of this potential are then transmitted substantially without change to grid 37 through resistor 42. During the positive half waves, however, the flow of grid current in triode 35 produces a sufficient voltage drop in resistor 42 to depress the potential of grid 37 to substantially cathode potential. The grid potential therefore assumes the wave form of curve 62 in which the positive half waves are substantially suppressed. If the transfer characteristic of triode 35 is represented by curve 63 it will be apparent that the plate current of triode 35 may be represented by curve 64.

As a result of the flow of plate current through resistor 36 the plate potential of triode 35 varies, and reversed in sign, may be represented by curve 64 read with respect to a new axis 65. The potential of point 49 varies as shown by curve 66 which is similar to curve 64 except for a shift of its axis. By a process similar to that above set forth with respect to grid 37, the positive half waves of the potential of point 49 are suppressed by the flow of current through resistor 48 to cause the potential of grid 45 to assume a substantially trapezoidal wave form represented by curve 67.

Assuming the transfer characteristic of triode 43 to be represented by curve 68, the plate current of triode 43 has the wave form represented by curve 69. The plate potential of triode 43 reversed in sign may also be represented by curve 69 with its axis shifted as at 70.

It will be understood that voltage divider 39 may also be so adjusted that the potential impressed therefrom on grid 37 is of sufficient magnitude to depress the grid potential below the cut off point during the negative half cycles. The plate potential of triode 35 is then caused to assume a substantially trapezoidal wave form. With this adjustment triode 43 merely serves to increase the steepness of the sloping parts of the wave, the operation of the device otherwise remaining as herein set forth. As a result of the proportioning of capacitor 51 and resistor 50, the potential of point 60 at the juncture thereof consists of a series of impulses proportional to the rate of change of the plate potential of triode 43. As the plate potential is of substantially trapezoidal wave shape with either adjustment of voltage divider 39, the potential impulses of point 60 are substantially as represented by curve 71. The axis of curve 71 is displaced downward as a result of the connection of resistor 50 with resistor 53, whereby a negative potential component equal to the voltage drop in resistor 53 is impressed on point 60 and grid 34.

The potential impulses are of such magnitude that each positive impulse renders thyratron 29 conductive to discharge capacitor 6 through switch 24, resistor 28, thyratron 29, and meter 31 in parallel with resistor 33. The capacitor discharge current may be represented by curve 72 consisting of a series of impulses. During each discharge of capacitor 6 current also flows from conductor 8 through resistor 23, resistor 28, thyratron 29, meter 31 in parallel with resistor 33 and glow tube 21 to conductor 9. This current is taken into account in the calibration of meter 31.

After each discharge of the capacitor this additional current tends to continue to flow and thereby prevent the capacitor from becoming recharged. The additional current, however, may easily be interrupted at the end of each discharge period of the capacitor by making the discharge circuit sufficiently inductive or by limiting the additional current to a value which is insufficient to maintain thyratron 29 conductive. The differentiating circuit is so dimensioned that the potential impulses impressed on grid 34 are shorter than the discharge periods of the capacitor. Grid 34 thus returns to a negative potential during the flow of the discharge current through the thyratron, and the thyratron returns immediately to the nonconductive condition after each capacitor discharge. The capacitor thereupon is immediately recharged in the manner above set forth in preparation for another discharge thereof during the following cycle of the voltage of generator 7.

The periodic alternate operation of the charging and discharging circuits results in the flow of current impulses through meter 31 and resistor 33. These impulses are converted into a substantially uniform current by the action of capacitor 32, whereby the damping means of meter 31 are assisted in maintaining the indications thereof steady from one cycle to the next. As the amount of energy stored in capacitor 6 between discharges is constant, each current impulse through thyratron 29 has a uniform value regardless of the frequency of the impulses, and the average amplitude of the current flow through meter 31 is exactly proportional to the frequency of generator 7. The readings of meter 31 may therefore be translated into cycles per second, the factor of proportionality between the meter current and the frequency being adjusted by the setting of resistor 33.

During operation of the charging and discharging circuits, meter 31 also receives a current component opposite to the capacitor discharge current. This component, which flows from ground through meter 31 and resistor 55 to conductor 9, is independent of the operation of capacitor 6 and may be considered to neutralize the effect on meter 31 of an equal amount of the capacitor discharge current. The net result is that a constant portion of the capacitor discharge current is bypassed from meter 31 through resistor 55 so that the range of frequency for which readings can be obtained on meter 31 is shifted to a corresponding extent. Readings below a predetermined frequency are thus suppressed and the entire scale of meter 31 may be utilized for a desired limited range of frequencies beginning with the predetermined frequency.

To adjust the calibration of meter 31, switch 41 is reversed to disconnect generator 7 from the device and to connect grid 37 to the calibrating circuit comprising resistor 56, capacitor 57, resistor 58 and capacitor 59. The calibrating circuit is impressed with the output voltage of rectifier 11 but the elements of the circuit are so chosen as to block the unidirectional component of such voltage and to attenuate the alternating components. Switch 41 is thus impressed with a complex alternating potential in which the second harmonic of the voltage of circuit 10, having a frequency of 120 cycles per second, is predominant to the extent of being alone effective.

Impression of this potential on grid 37 causes operation of the device in the manner above set forth and resistor 33 is then adjusted to cause meter 31 to read exactly 120 cycles per second. Switch 41 may then be returned to the position shown to enable the device to indicate the frequency of generator 7 or any other source operating at a frequency within the range for which the device is built. This range may be varied at will by substituting capacitors such as capacitors 25, 26 for capacitor 6 provided, however, that the capacitor discharge current impulses remain longer than the potential impulses impressed on grid 34 and that the thyratron 29 be given sufficient time to return to the nonconducting condition between successive capacitor discharge impulses.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a device for supplying successive discharge current impulses from a capacitor as a measure of the frequency of alternating voltages, the combination of a source of direct current, a capacitor, impedance means connecting said capacitor with said source to charge said capacitor, a circuit bridged across said capacitor including a discontinuously controllable electric valve for discharging said capacitor through said valve when said valve is rendered conductive, and means for controlling the conductivity of said valve comprising means for converting an alternating potential into a potential of substantially trapezoidal wave form and means for converting the potential of trapezoidal wave form into potential impulses of shorter duration than the discharge periods of said capacitor.

2. In a device for supplying successive discharge current impulses from a capacitor as a measure of the frequency of alternating voltages, the combination of a source of direct current, a capacitor, impedance means connecting said capacitor with said source to charge said capacitor, a circuit bridged across said capacitor including a discontinuously controllable electric valve for discharging said capacitor through said valve when said valve is rendered conductive, and means for controlling the conductivity of said valve comprising a control electrode of said valve, a first triode having a grid and means for impressing an alternating potential on said grid comprising a resistor connected with said grid for substantially suppressing the positive half waves of said potential, a second triode having a second grid, a coupling connection between said triodes comprising a resistor connected with said second grid for causing the potential of said second grid to be of substantially trapezoidal wave form, and means connecting said second triode with said control electrode comprising a source of negative unidirectional potential and a differentiating circuit for causing impression on said control electrode of potential impulses shorter than the discharge periods of said capacitor.

3. In a device for supplying successive discharge current impulses from a capacitor as a measure of the frequency of alternating voltages, the combination of a source of direct current, a capacitor, impedance means connecting said capacitor with said source to charge said capacitor, a circuit bridged across said capacitor including a discontinuously controllable electric valve for discharging said capacitor through said valve when said valve is rendered conductive, and means for controlling the conductivity of said valve comprising a control electrode of said valve, a first triode having a grid and means for impressing an alternating potential on said grid comprising a resistor connected with said grid for substantially suppressing the positive half waves of said potential, a second triode having a second grid, a resistance-capacitance coupling connection between said triodes comprising a resistor connected with said second grid for causing the potential of said second grid to be of substantially trapezoidal wave form, and means connecting said second triode with said control electrode comprising a source of negative unidirectional potential and a differentiating circuit comprising a resistor serially connected with a capacitor for converting the plate potential of said second triode into potential impulses proportional to the rate of change of the plate potential, said differentiating circuit having a time constant which is shorter than the discharge period of the first said capacitor.

4. In a device for supplying successive discharge current impulses from a capacitor as a measure of the frequency of alternating voltages, the combination of a source of direct current, a plurality of capacitors of different capacitances, a capacitor charging circuit comprising impedance means connected with said source, a selector switch for connecting a selected one of said capacitors with said charging circuit, a constant voltage discharge device, impedance means connecting said discharge device with the terminals of said source, a rectifying device connecting said discharge device across said selected capacitor to limit the voltage of said selected capacitor to a predetermined constant value, a circuit bridged across said selected capacitor comprising a discontinuously controllable electric valve for discharging said selected capacitor through said valve when said valve is rendered conductive, and means for controlling the conductivity of said valve comprising a control electrode of said valve, a first triode having a grid and means for impressing an alternating potential on said grid comprising a resistor connected with said grid for substantially suppressing the positive half waves of said potential, a second triode having a second grid, a resistance-capacitance coupling connection between said triodes comprising a resistor connected with said second grid for causing the potential of said second grid to be of substantially trapezoidal wave form, and means connecting said second triode with said control electrode comprising a source of negative unidirectional potential and a differentiating circuit comprising a capacitor connected to the anode of the second said valve and a resistor connected to the negative terminal of said source for converting the output voltage of said second triode into potential impulses proportional to the rate of change of the output voltage and for impressing on said control electrode a negative potential component, said differentiating circuit having a time constant which is shorter than the discharge periods of said plurality of capacitors.

5. In a frequency responsive device, the combination of a source of direct current of predetermined voltage, a device consuming current under a constant voltage smaller than said predetermined voltage, first impedance means connecting said constant voltage device across said source, a capacitor, a capacitor charging circuit comprising second impedance means connecting said capacitor across said source to supply charging current to said capacitor at said predetermined voltage, and a rectifying device connecting said constant voltage device in parallel with said capacitor and in series with said second impedance means to stop the flow of charging current through said capacitor in response to rise of the voltage of said capacitor to the value of said constant voltage.

6. In a frequency responsive device, the combination of a source of direct current of predetermined voltage, a device consuming current under a constant voltage smaller than said predetermined voltage, first impedance means connecting said constant voltage device across said source, a capacitor, a capacitor charging circuit comprising second impedance means connecting said capacitor across said source to supply charging current to said capacitor at said predetermined voltage, a rectifying device connecting said constant voltage device in parallel with said capacitor and in series with said second impedance means to stop the flow of charging current through said capacitor in response to rise of the voltage of said capacitor to the value of said constant voltage, and means for periodically discharging said capacitor.

7. In a device for supplying successive discharge current impulses from a capacitor as a measure of the frequency of alternating voltages, the combination of a source of direct current of predetermined voltage, a device consuming current under a constant voltage smaller than said predetermined voltage, first impedance means connecting said constant voltage device across said source, a capacitor, a capacitor charging current comprising second impedance means connecting said capacitor across said source to supply charging current to said capacitor at said predetermined voltage, a rectifying device connecting said constant voltage device in parallel with said capacitor and in series with said second impedance means to stop the flow of charging current through said capacitor in response to rise of the voltage of said capacitor to the value of said constant voltage, a circuit bridged across said capacitor including an electric valve for discharging said capacitor through said valve when said valve is rendered conductive, and means for periodically rendering said valve conductive to discharge said capacitor.

8. In a device for supplying successive discharge current impulses from a capacitor as a measure of the frequency of alternating voltages, the combination of a source of direct current of predetermined voltage, a device consuming current under a constant voltage smaller than said predetermined voltage, first impedance means connecting said constant voltage device across said source, a capacitor, a capacitor charging circuit comprising second impedance means connecting said capacitor across said source to supply charging current to said capacitor at said predetermined voltage, a rectifying device connecting said constant voltage device in parallel with said capacitor and in series with said second impedance means to stop the flow of charging current through said capacitor in response to rise of the voltage of said capacitor to the value of said constant voltage, a circuit bridged across said capacitor including an electric valve for discharging said capacitor through said valve when said valve is rendered conductive, said valve having a control electrode, and means for impressing on said control electrode periodic potential impulses of shorter duration than the discharge periods of said capacitor.

9. In a device for supplying successive discharge current impulses from a capacitor as a measure of frequency of alternating voltages, the combination of a source of direct current of predetermined voltage, a device consuming current under a constant voltage smaller than said predetermined voltage, first impedance means connecting said constant voltage device across said source, a capacitor, a capacitor charging circuit comprising second impedance means connecting said capacitor across said source to supply charging current to said capacitor at said predetermined voltage, a rectifying device connecting said constant voltage device in parallel with said capacitor and in series with said second impedance means to stop the flow of charging current through said capacitor in response to rise of the voltage of said capacitor to the value of said constant voltage, a discharging circuit connected with said capacitor, and means for periodically causing alternate operation of said capacitor charging and discharging circuits.

WALTHER RICHTER.

REFERENCES CITED

The following references are of record in the file of this patent:

UNITED STATES PATENTS

| Number | Name | Date |
|---|---|---|
| Re. 22,572 | Miller | Nov. 28, 1944 |
| 2,226,185 | Sturm et al. | Dec. 24, 1940 |
| 2,232,959 | Miller | Feb. 25, 1941 |
| 2,260,933 | Cooper | Oct. 28, 1941 |
| 2,325,027 | Wilbur | Aug. 3, 1943 |
| 2,352,082 | De Rosa | June 20, 1944 |
| 2,355,363 | Christaldi | Aug. 8, 1944 |
| 2,393,701 | Moyer | Jan. 29, 1946 |
| 2,412,485 | Whiteley | Dec. 10, 1946 |
| 2,422,205 | Meacham | June 17, 1947 |

OTHER REFERENCES

Pulse Generation, Lenihan, Electronic Engineering, March 1944, pages 408–411. Copy in 175–368.

Electronic Industries, Aug. 1943, pages 65–72 and 216. Copy in 175–183 Sp.